(12) United States Patent
Staudte et al.

(10) Patent No.: US 8,582,748 B2
(45) Date of Patent: Nov. 12, 2013

(54) METHOD AND SYSTEM FOR COMMUNICATION FORWARDING

(75) Inventors: Thomas Staudte, Zurich (CH); Erich Gebhardt, Zurich (CH); Frank Fitzlaff, Langnau (CH); Oscar Genovese, Winterthur (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 13/170,883

(22) Filed: Jun. 28, 2011

(65) Prior Publication Data

US 2012/0020470 A1    Jan. 26, 2012

(30) Foreign Application Priority Data

Jul. 20, 2010  (EP) ...................................... 10007498

(51) Int. Cl.
*H04M 3/54*  (2006.01)

(52) U.S. Cl.
USPC .................................................... 379/211.02

(58) Field of Classification Search
USPC ........................................ 379/211.01–211.05
See application file for complete search history.

(56) References Cited

FOREIGN PATENT DOCUMENTS

WO    WO 2004/100575 A2 * 11/2004

* cited by examiner

*Primary Examiner* — Harry Hong

(74) *Attorney, Agent, or Firm* — McAndrews, Held & Malloy, Ltd.

(57) ABSTRACT

For enabling the forwarding of communication requests directed by callers to callees who are subscribers of a carrier network (4) and users in an enterprise network (5), forwarding-profile information is received in a computerized central unit (2). The central unit (2) transfers forwarding information to a network server (41) in the carrier network (4) and/or a network server (51) in the enterprise network (5) for enabling the network servers (41, 51) to forward communication requests based on forwarding information. Thus, forwarding-profile information can be captured and maintained in one central location for generating consistent forwarding-profiles in a plurality of separate communication networks (4, 5, 8) which are operated and managed independently form each other by different entities with regards to technical platforms and organization.

22 Claims, 7 Drawing Sheets

METHOD AND SYSTEM FOR COMMUNICATION FORWARDING

FIELD OF THE INVENTION

The present invention generally relates to the field of telecommunications. Specifically, the present invention relates to a method and a system for enabling forwarding of communication requests directed by callers to a callee who is a subscriber of a carrier network and a user of an enterprise network.

BACKGROUND OF THE INVENTION

Companies typically maintain private enterprise networks, e.g. a private branch exchange (PBX), for providing a voice communication system within their premises. A subscriber can then establish a PBX call connection with another subscriber within the same PBX system without ever using a public carrier network, e.g. a Public Switched Telephone Network (PSTN) and/or a Public Land Mobile Network (PLMN). Since no PSTN or PLMN service is used in establishing the PBX call connection, no service charges would be levied against the PBX user by the public service provider. In the same way, many companies operate other forms of private enterprise networks, e.g. local area networks (LANs) for providing independent data communication systems. Such LAN communication enables multiple users to communicate and access Internet, e-mail and database servers.

Both in private enterprise networks and in public carrier networks, various call forwarding services are currently available. For instance, calls from a selected set of numbers can be forwarded to a number of the subscriber's choice. Other services automatically forward calls to another number when the subscriber's line is busy.

US 2004/100575A2 describes a method and system for call forwarding in a telephony network. A subscriber of the telephony network specifies caller groups which are stored as subscriber data in a home location register (HLR). When the subscriber connects to a mobile switching center (MSC), the subscriber data in a visiting location register (VLR) associated with the MSC is updated with the sub-scriber data in the HLR. A call originating from a caller in a nominated caller group is connected directly to the subscriber or the subscriber is notified of the incoming call. Connecting such a call to the subscriber may include disconnecting a pre-existing call.

US 2005/0096029 describes a method of forwarding calls for a subscriber having a primary communication device and a plurality of alternate communication devices in a multimedia telecommunication network. The method comprises storing a call forwarding-profile for the subscriber's primary communication device at a network sever. The call forwarding-profile specifies at least one of the alternate communication devices to which calls are to be forwarded, depending on whether they include voice, video or data media, for example.

US 2003/0069030 describes a system, a method and an apparatus for providing a subscriber feature supported by a private enterprise network to a mobile subscriber travelling within a public carrier network. Outgoing call connection requests by the subscriber are forwarded over the private enterprise network, even if the subscriber is roaming in the public carrier network. Such subscriber features include speed dialing, short dialing, corporate long distance services, conference calls, etc.

US 2001/0048738 describes a method and system for providing call forwarding in an IP telephone network based on call forwarding-profiles. The call forwarding is based on the type of callers, and one or more destination addresses can be specified. The call is connected to a first phone, if an active call forwarding-profile is not found. If an active call forwarding-profile is found, the call is routed to at least a third telephone based on the call forwarding-profile. The method and system described in US 2001/0048738 are limited to a single IP telephone network.

EP2048863 A1 describes a telecommunication system which routes an inbound telephone communication through an enterprise communication network. The communication is routed to a first user, and if the first user does not answer, the communication is routed to a second user, based on predetermined user profile information. Communications requests can only be forwarded to a user, if the user is connected to the enterprise communication network.

SUMMARY OF THE INVENTION

It is an object of this invention to provide a method and a system for enabling the forwarding of communication requests directed by callers to a callee who is a subscriber of a carrier network and a user of an enterprise network. In particular, it is an object of the present invention to provide a method and a system for enabling the forwarding of the communication requests for a callee who is moving between the carrier network and the enterprise network.

A caller is an initiator or sender of a communication request, i.e. a calling party, user or subscriber; whereas a callee is the addressee or recipient of the communication request, i.e. the called party, user or subscriber.

A caller may initiate a communication request using different types of communication technologies, such as voice phone call, video phone call, SMS (Short Message Services), e-mail (electronic mail), IMS (Instant Messaging Services) or Social Networks.

According to the present invention, these objects are achieved through the features of the independent claims. In addition, further advantageous embodiments follow from the dependent claims and the description.

According to the present invention, the above mentioned objects are particularly achieved in that for enabling forwarding of communication requests directed by callers to a callee, who is both, a subscriber of a carrier network and a user of an enterprise network, a central unit receives forwarding-profile information which defines the forwarding of communication requests directed to the callee by the callers. The central unit stores forwarding-profiles which are defined by the forwarding-profile information and are assigned to the callee. The central unit transfers forwarding information to a network server in the carrier network and and/or a network server in the enterprise network for enabling the network server in the carrier network and the network server in the enterprise network to forward the communication requests based on forwarding-profiles assigned to the callee. Thus, forwarding-profile information can be captured and maintained in one central location for generating and storing consistent forwarding information for a plurality of separate communication networks which are operated and managed independently form each other by different entities with regards to technical platforms and organization.

In one embodiment, the forwarding information includes forwarding instructions instructing the network servers how to forward the communication requests, in another embodiment the forwarding information includes forwarding-profile information enabling the network servers to establish and maintain local forwarding-profiles.

In a preferred embodiment, the central unit provides a user interface and receives through a telecommunication network via the user interface the forwarding-profile information entered by the callee. The forwarding-profile information is stored at the central unit and displayed via the user interface. Thus, the user of the enterprise network, who is also a subscriber to the carrier network, is provided with a single user interface to manage concurrently the forwarding of communication requests in the enterprise network and the carrier network.

In another preferred embodiment, the central unit receives via the user interface a selection by the callee of an active forwarding-profile from a plurality of forwarding-profiles associated with the callee, and transfers the callee's selection of the active forwarding-profile to at least one network server in the carrier network and at least one network server in the enterprise network for enabling the network server in the carrier network and the network server in the enterprise network to forward the communication requests based on the active forwarding-profile of the callee. Thus, the user is provided with an efficient mechanism to switch dynamically between several stored forwarding-profiles, and the user can select an active forwarding-profile according to his needs, e.g. depending on his current state, availability and/or location.

In another embodiment, the forwarding-profiles of the callee in the carrier network and in the enterprise network are synchronized by receiving at the central unit altered forwarding-profile information from the network server in the carrier network and from the network server in the enterprise network. The altered forwarding-profile information is transferred from the central unit to the network server in the carrier network or the network server in the enterprise network, respectively. Accordingly, consistency and data integrity of the callee's forwarding-profiles are maintained automatically in both the carrier network and the enterprise network, in case there are local changes to the forwarding-profiles originating from within the carrier network or the enterprise network, respectively, e.g. as a result of manipulations by the operator of the carrier network or the enterprise network, respectively.

In another embodiment, receiving the forwarding-profile information in the central unit comprises receiving categorizations of callers into caller groups, receiving destination addresses for forwarding communication requests directed to the callee, and receiving forwarding-schemes which specify for the caller groups whether a communication request is forwarded to one or more of the destination addresses. Thus, the callee may specify for various caller groups different destination addresses.

In another preferred embodiment, receiving the forwarding-profile information in the central unit comprises receiving forwarding-schemes which specify for different communication technologies, e.g. voice phone call, video phone call, SMS (Short Messaging Services), e-mail (electronic mail), Social Networks and/or instant messaging services (IMS), whether a communication request received through one of these technologies is forwarded to one or more destination addresses using a communication technology specified by the forwarding-scheme. Thus, the user is enabled to manage all his incoming communication using a single service which configures forwarding settings in the carrier network and the enterprise network at the same time. In particular, various combinations of communication forwarding depending on and using different communication technologies become possible. Moreover, it is a further advantage of the present invention that communication technologies may be specified for the individual caller groups.

In another embodiment, the forwarding-profile information enables at least one network server in the carrier network and at least one network server in the enterprise network to determine for communication requests in each case the caller group and the communication technology associated with the respective communication request. Moreover, the forwarding-profile information enables the network servers to determine a forwarding-scheme defined by an active forwarding-profile selected by the callee, and to forward the communication request from a caller according to the forwarding-scheme defined by the active forwarding-profile to one or more destination addresses using the communication technology specified by the forwarding-scheme.

In addition to a method and a computer system for enabling the forwarding of communication requests directed by callers to a callee, who is a subscriber of a carrier network and a user of an enterprise network, the present invention also relates to a computer program product comprising computer program code, preferably computer program products comprising a tangible computer-readable medium having stored thereon the computer program code. The computer program code directs one or more processors of a computerized central unit, such that the central unit receives forwarding-profile information which defines forwarding of communication requests directed by callers to a callee, who is a subscriber of a carrier network and a user of an enterprise network. Furthermore, the computer program code directs the one or more processors of the central unit such that the central unit generates and stores forwarding-profiles defined by the forwarding-profile information and assigned to the callee. The computer program code also directs the one or more processors of the central unit such that the central unit transfers forwarding information to a network server in the carrier network and/or a network server in the enterprise network for enabling the network server in the carrier network and the network server in the enterprise network to forward the communication requests based on forwarding-profiles assigned to the callee.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
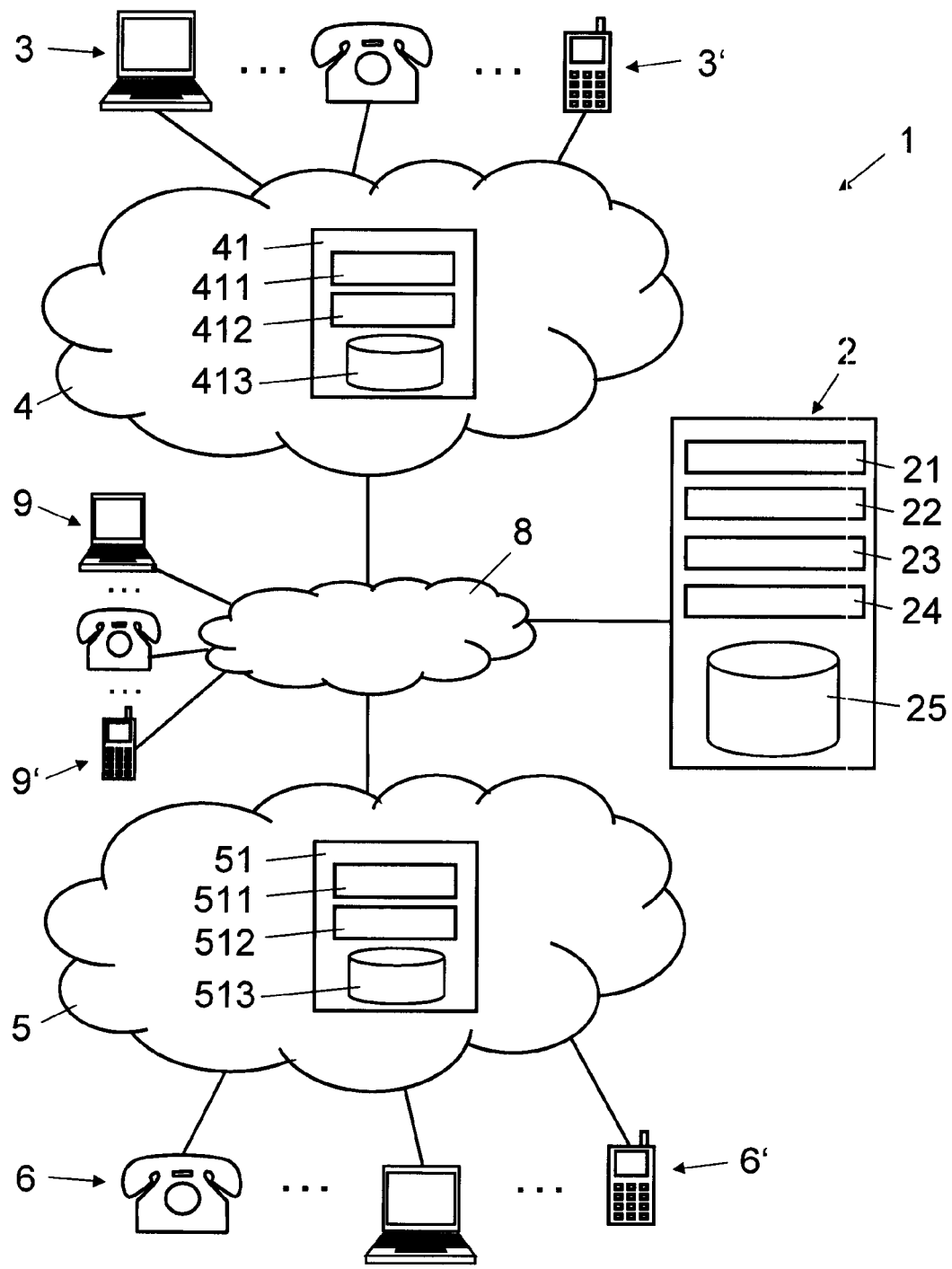
FIG. 1 shows a block diagram illustrating schematically a system for forwarding of communication requests directed by callers to callees who are subscribers of the carrier network and users of the enterprise network, based on forwarding-profile information managed by a central unit.

In FIG. 1, reference numeral 1 refers to a system for communication forwarding between two networks using centrally managed forwarding-profiles. The system comprises a computerized central unit 2, a network server 41 in a public carrier network 4 and a network server 51 in a private enterprise network 5. The central unit 2, the public carrier network 4 and the private enterprise network 5 are connected with each other, e.g. via direct communication links or a telecommunication network 8, e.g. a telecommunication network 8 comprising another carrier network operated by another telecommunication provider and/or the Internet.

Preferably, the carrier network 4 is a Public Switched Telephone Network (PSTN) comprising a fixed line communication network and/or a mobile radio communication network. In another preferred embodiment, the carrier network 4 comprises an intelligent Network (IN) based on the Signaling System No. 7 (SS7) protocol or another IP-based signaling protocol. In yet another embodiment, the carrier network 4 is a network based on the Internet Protocol (IP). One or more communication terminals 3, 3' are connected to the network server 41 via the carrier network 4. The network server 41 is configured to forward communication requests from and to the communication terminals 3, 3'.

The enterprise network 5 is preferably a private branch exchange (PBX) network, a local area network (LAN) or a combination of both. Alternatively, the enterprise network 5 may comprise several (logical) data networks. Moreover, the enterprise network 5 may comprise a fixed line communication network and/or a mobile radio communication network. One or more communication terminals 6, 6' are connected to the network server 51 via the enterprise network 5. The network server 51 is configured to forward communication requests from and to the communication terminals 6, 6'. For example, the network server 51 is an enterprise real-time communication server such as 3n Office Communication Server (OCS), which provides an infrastructure for, e.g. voice and video calling, instant messaging and/or file transfer, within the premises of the enterprise. Preferably, access to the enterprise network 5 is secured by means of a firewall, for example.

The communication terminals 3, 3', 6, 6', 9, 9' include but are not limited to fixed or mobile telephones, automatic recording devices such as answering machines, fixed or mobile personal computers, and personal data assistants for data communication, voice communication and/or Voice over IP (VoIP) communication. For example, the communication terminals 3, 3', 6, 6', 9, 9' include conventional wired handsets, mobile radio phones or mobile computers with a WLAN (Wireless Local Area Network), or other communication modules for mobile communication, compliant to standards such as GSM (Global System for Mobile Communication), UMTS (Universal Mobile Telecommunication System) or DECT (Digital Enhanced Cordless Telecommunications).

The central unit 2 includes an operational computer with one or more processors. Furthermore, the central unit 2 includes several functional modules, including a user interface module 21, a receiving module 22, a transferring module 23 and a profile management module 24. The user interface module 21 provides a user interface 100 for display, input and manipulation of forwarding-profile information. The user interface 100 includes e.g. a web interface which is configured to exchange forwarding-profile information through a telecommunication network, e.g. the internet, or a direct communication link with the central unit 2. Moreover, the user interface 100 may comprise a user interface for system administrators which have special rights to manipulate data stored at the central unit 2. The central unit 2 further includes a data store 25 e.g. a memory subsystem which comprises a data base system or another system for efficient storage of user data, for example.

In alternative embodiments of the present invention, which are not illustrated in FIG. 1, the central unit 2 is hosted either by the network server 41 in the carrier network 4 or by the network server 51 in the enterprise network 5. In further embodiments of the present invention, the central unit 2 is hosted by a computer system connected to the network server 41 or network server 51, the computer system being located in the carrier network 4 or the enterprise network 5, respectively.

The network server 41 in the carrier network 4 includes an operational computer with one or more processors. Furthermore, the network server 41 includes various functional modules, including a communication interface 412 and a forwarding module 411. The communication interface 412 is configured to communicate via a telecommunication network 8 or a direct communication link with the central unit 2. The network server 41 further includes a data store 413, e.g. a memory subsystem, which includes a data base system or another system for efficient storage of user data, for example.

The network server 51 in the enterprise network 5 includes an operational computer with one or more processors. Furthermore, the network server 51 includes various functional modules, including a communication interface 512 and a forwarding module 511. The communication interface 512 is configured to communicate via a telecommunication network 8 or a direct communication link with the central unit 2. The network server 51 further includes a data store 513, e.g. a memory subsystem, which includes a data base system or another system for efficient storage of user data, for example.

In another embodiment of the present invention, the communication interfaces 412 and 512 are further configured to establish a communication channel between the network servers 41 and 51, e.g. via a telecommunication network 8 or a direct communication link.

Preferably, the functional modules are implemented as programmed software modules comprising computer program code for directing a processor of a computer to perform functions as described later in more detail. The computer program code is stored on a tangible computer-readable medium which is connected fixed or removably in the respective computer. One skilled in art will understand, however, that in alternative embodiments the functional modules may be implemented fully or at least partly by way of hardware components.

Figure 2:
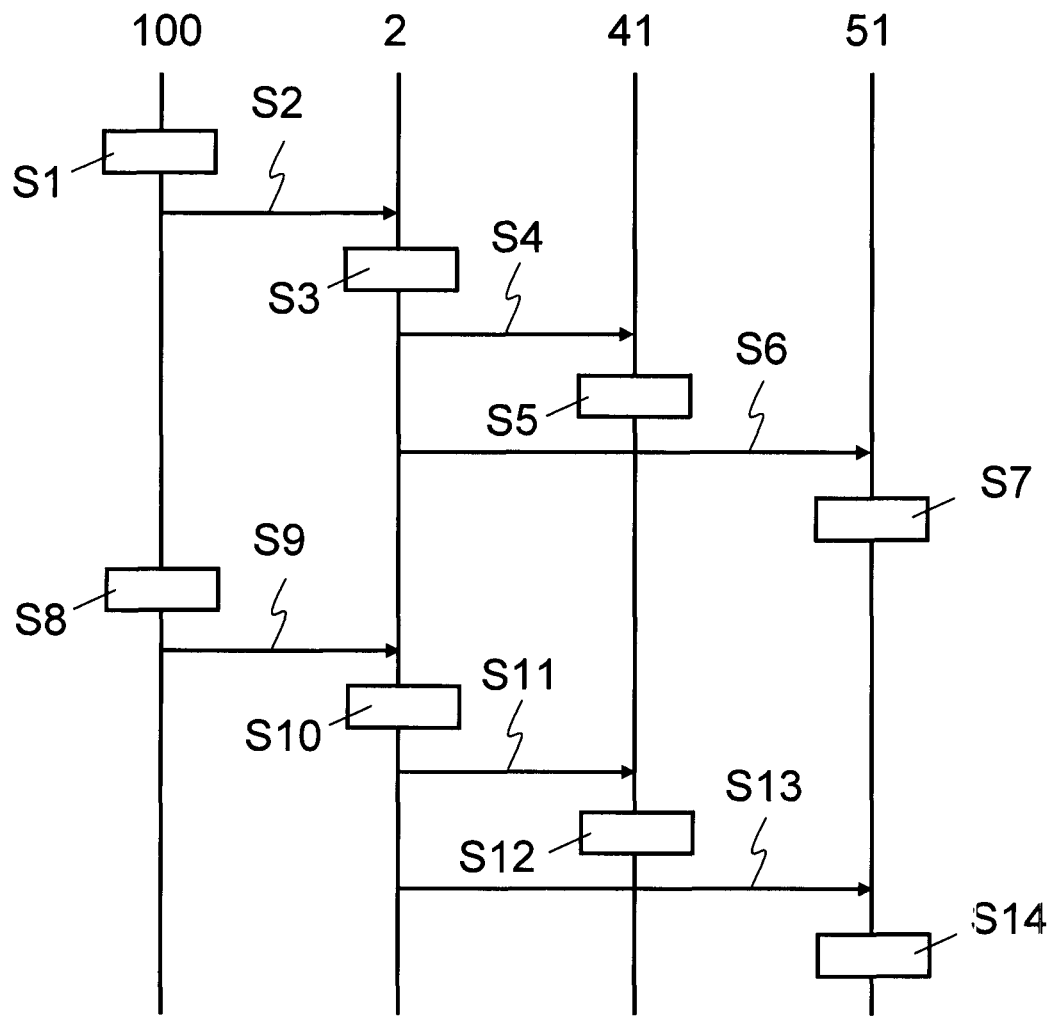
FIG. 2 shows a flow diagram illustrating an example of a sequence of steps for setting up and managing forwarding-profile information for enabling the forwarding of communication requests directed by callers to callees who are subscribers of the carrier network and users of the enterprise network.
Figure 3:
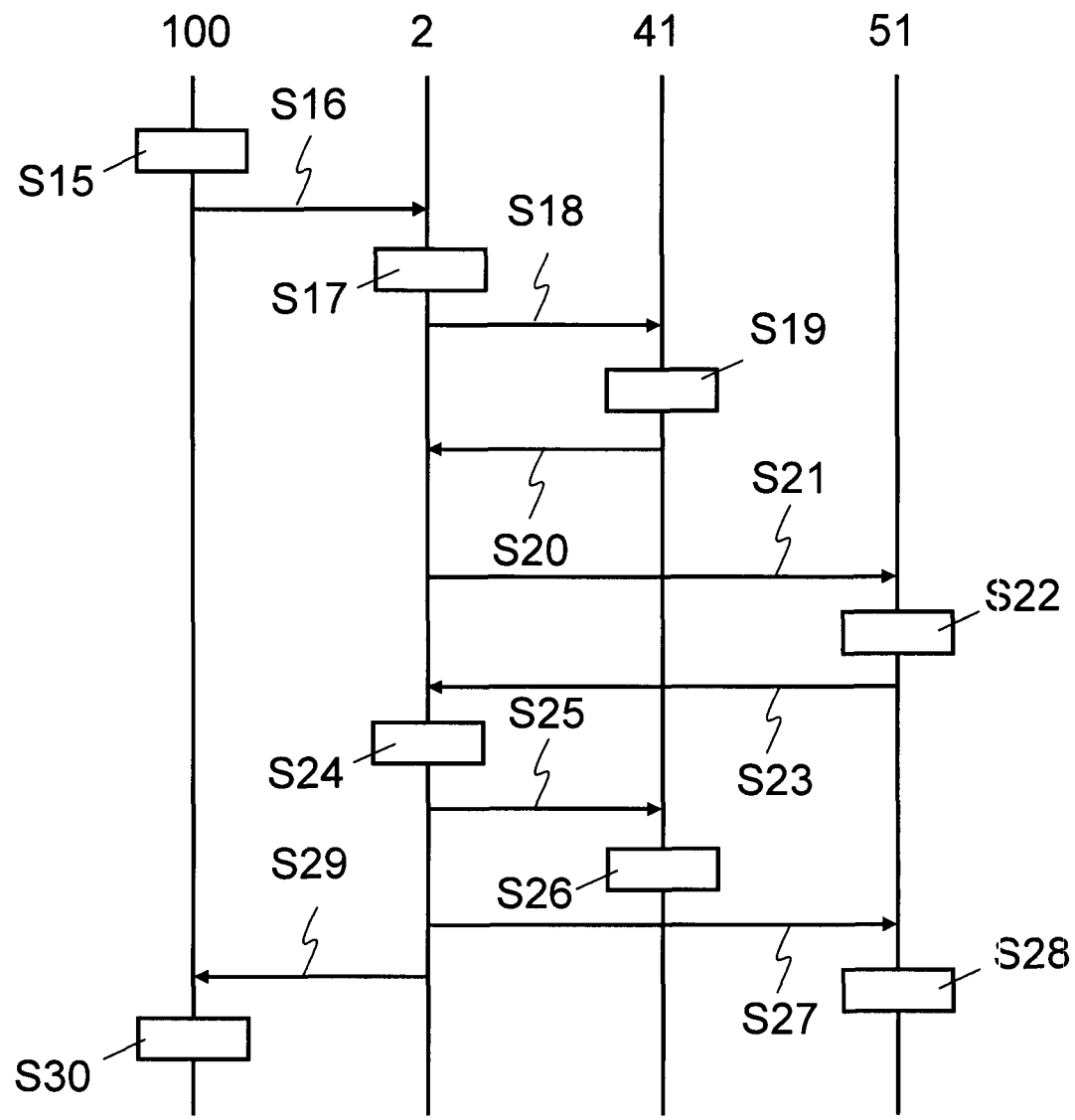
FIG. 3 shows a flow diagram illustrating another example of a sequence of steps for setting up and managing forwarding-profile information for enabling the forwarding of communication requests directed by callers to callees who are subscribers of the carrier network and users of the enterprise network
Figure 4:
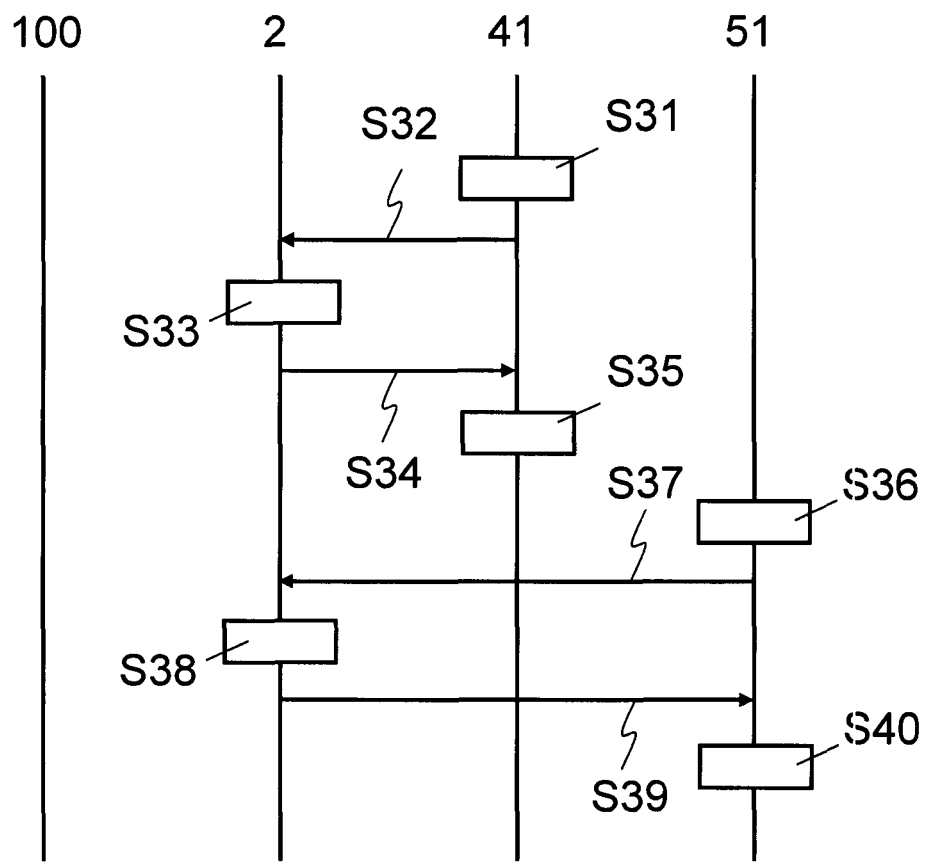
FIG. 4 shows a flow diagram illustrating another example of a sequence of steps for enabling the forwarding of communication requests based on the forwarding-profile information.

In the following paragraphs, described with reference to FIGS. 2 to 4 are possible sequences of steps performed by the functional modules for setting up and managing callee-specific forwarding-profiles to enable the forwarding of communication requests submitted by callers to a callee, who is a subscriber of the carrier network 4 and a user of the enterprise network 5. To be a user of the enterprise network 5, a callee is setup and stored with assigned access rights and authorization credentials in a user database of the enterprise network 5. Likewise the callee is setup and stored with assigned subscription and subscriber data in a subscriber database of the carrier network 4. In the carrier network 5, at least some of the subscription and subscriber data is replicated in a home location register (HLR), a home subscriber services (HSS) database and/or in visitor location registers (VLR) of other carrier networks.

The callee uses communication terminals 3, 3', 6, 6' located or roaming in the carrier network 4 or in the enterprise network 5. Depending on the type of network and communication terminal 9, 9', the callee may also roam into other communication networks 8 where he is registered temporarily in a VLR, for example, and has his location reported to an HLR in the carrier network 4.

As will be explained below in more detail, communication requests submitted by callers to a callee are forwarded based on centrally managed forwarding-profile information, particularly for forwarding data, including voice data, specifically VoIP data, or other data, e.g. e-mail data, SMS (Short Messaging Services) data, Instant Messaging Services (IMS) data, voice mail data or any other user data. The following paragraphs differentiate between a caller, i.e. a person using a communication terminal 3, 3', 6, 6', 9, 9' to initiate a (originating) communication request and a callee, i.e. a person using a communication terminal 3, 3', 6, 6', 9, 9' to which said communication request is directed.

In an embodiment, forwarding is limited to communication requests from communication terminals 3, 3' roaming in the carrier network 4 to communication terminals 6, 6' roaming in the enterprise network 5 and vice versa. It should also be noted that in some cases communication terminals 3, 3', 6, 6' can also be connected to both the carrier network 4 and the enterprise network 5.

In step S1, the callee or an authorized person specifies new or altered forwarding-profile information via the user interface 100. The user interface 100 and thus the central unit 2 is accessed by the user on a communication terminal 3, 3', 6, 6', 9, 9' in the Enterprise network 5, the carrier network 4, or another telecommunications network 8.

The forwarding-profile information is associated with and assigned to the callee, and includes caller group information and the actual forwarding-profiles. Table 1 illustrates an exemplary data structure for the specification of caller groups: for a callee, possible callers are categorized in caller groups, wherein a caller group is specified by a group name and a plurality of caller addresses. The caller addresses include, e.g. telephone numbers, e-mail addresses or instant messaging user names.

TABLE 1

| Callee | Caller Group | |
|---|---|---|
| | Group Name | Caller Address |

Still in step S1, the callee or an authorized person specifies new or altered forwarding-profiles associated with and assigned to the callee by defining, entering and/or altering respective forwarding-profile information via the user interface 100.

Table 2 illustrates an exemplary data structure for the specification of forwarding-profiles: for a callee, a forwarding-profile is specified by a profile name and a list of forwarding-schemes. As will be explained later in more detail, a callee may define more than one forwarding-profile, but only one forwarding-profile will be active, and communication forwarding will be derived from the active forwarding-profile. A forwarding-scheme specifies for a caller group and an incoming communication technology an outgoing communication technology as well as a destination address. The destination addresses include e.g. telephone numbers, e-mail addresses and/or instant messaging user names. If no destination address is specified, the communication request is blocked, i.e. not forwarded. On one hand, the incoming communication technology denotes the communication technology, e.g. phone call (voice), SMS, e-mail or instant messaging services, according to the communication request made by the caller. For instance, a caller sends a communication request to establish a phone call with the callee. On the other hand, the outgoing communication technology denotes the communication technology which is actually used to forward the communication request according to the forwarding-scheme. If, for instance, a caller originates a communication request in the form of a telephone call to the callee, the callee may specify, with the help of a first forwarding-scheme, to forward the communication request to an answering machine. In addition, with the help of a second forwarding-scheme, the callee may define to forward the communication request in the form of an SMS notification to his mobile phone.

TABLE 2

| Callee | Profile Name | Forwarding-Profile | | |
|---|---|---|---|---|
| | | Forwarding-Scheme | | |
| | | Caller Group | Incoming Communication Technology | Outgoing Communication Technology | Destination Address |

In step S2, the forwarding-profile information is transmitted from the user interface 100 through a telecommunication network 8 or a direct communication link to the central unit 2 where it is received by the receiving module 22.

In step S3, the receiving module 22 of the central unit 2 stores the forwarding-profile information in the data store 25 of the central unit 2. In addition, the profile management module 24 generates and stores forwarding-profiles assigned to the callee defined by the forwarding-profile information received in step S2 and/or previously stored in the data store 25 at the central unit 2. The forwarding-profiles are stored by the profile management module 24 in the data store 25 of the central unit 2.

From now on, all forwarding decisions will be directly or indirectly based on the forwarding-profile information stored at the central unit 2. As will be described with regard to the steps in FIG. 2 and FIG. 3, forwarding-profile information is transferred as forwarding information to the network servers 41, 51. The forwarding-profile information is then stored in the network servers 41, 51, synchronized with the forwarding-profile information stored in the central unit 2 and evaluated by the network server 41, 51 for each communication request.

As will be described with regard to the steps in FIG. 4, communication requests may also be forwarded to the central unit 2, evaluated by the central unit 2 based on forwarding-profile information stored at the central unit 2 and forwarding information in form of explicit forwarding instructions is transferred back the network servers 41, 51. In this embodiment, the network servers 41, 51 simply execute the forwarding instructions generated by the central unit 2.

Still in FIG. 2, in steps S4 and S6, the transferring module 23 of the central unit 2 transfers the forwarding-profile information to the network server 41 in the carrier network 4 and to the network server 51 in the enterprise network 5, where it is received by the communication interface 412 and the communication interface 512, respectively.

In steps S5 and S7, the forwarding-profile information is received and stored in the data stores 413 and 513 of the respective network servers 41, 51.

In step S8, the forwarding-profile information is displayed via the user interface 100. If the callee or another authorized person selects an active forwarding-profile from the plurality of forwarding-profiles displayed by the user interface 100, the selection is displayed by the user interface 100.

In a further embodiment of the present invention, the active forwarding-profile is determined automatically by the central unit 2 based on rules specified by the forwarding-profile information. Such rules include but are not limited to time-dependent rules and/or location-dependent rules. For the case of time-dependent rules, the active forwarding-profile is selected automatically in dependency of the current time (e.g. working hours of the callee, weekdays or week-ends, etc.). For the case of location-dependent rules, the current location of the callee is used to determine the active forwarding-profile. Using the Global Positioning System (GPS), the position of the callee is mapped, e.g. to his home or working address, and an active forwarding-profile is selected accordingly, i.e. the active forwarding-profile is selected based on the current location of the callee, which is periodically retrieved by the central unit 2 or reported by the networks servers 41, 51 to the central unit 2, for example. Furthermore, in an embodiment, the active forwarding-profile is selected depending on whether the communication terminal 3, 3', 6, 6', 9, 9' is connected to the carrier network 4, the enterprise network 5 or both networks, or, if applicable to telecommunication network 8. In a further embodiment, the active forwarding-profile is selected depending on status information whereby the current status is defined manually by the callee and/or automatically, e.g. by the network servers 41, 51.

In step S9, the selection of the active forwarding-profile is transmitted to the central unit 2 where it is received by the receiving module 22.

In step S10, the receiving module 22 stores the selection of the active forwarding-profile in the data store 25.

Subsequently, in steps S11 and S13, the selection of the active forwarding-profile is transmitted by the transferring module 23 of the central unit 2 to the to the network server 41 in the carrier network 4 and to the network server 51 in the enterprise network 5, where it is received by the communication interface 412 and the communication interface 512, respectively.

In steps S12 and S14, the communication interfaces 412 and 512 of the network servers receive the selection of the active forwarding-profile and store the respective data in the data stores 413 and 513, respectively.

Subsequently, the forwarding modules 411 and 511 perform the actual communication forwarding according to the forwarding-profile information: the forwarding modules determine for each communication request from a communication terminal 3, 3', 6, 6', 9, 9' the caller group and incoming communication technology associated with the respective communication request. Furthermore, the forwarding modules 411 and 511 determine the forwarding-scheme defined by the currently active forwarding-profile and forward the communication request from the caller to one or more destination addresses as defined by the forwarding-profile. The communication request is forwarded using the outgoing communication technology specified by the forwarding-scheme. If a communication request from a communication terminal 3, 3', 9, 9' in the carrier network 4 or the telecommunication network 8, respectively, is directed to a communication terminal 6, 6' in the enterprise network 5, the forwarding is executed, e.g. via the telecommunication network 8 or the direct communication link between the carrier network 4 and the enterprise network 5. In another embodiment of the present invention, the forwarding is further executed via the forwarding modules 411 and 511 of the network servers. The same holds for communication requests from communication terminals 6, 6' in the enterprise network 5 directed to communication terminals 3, 3', 9, 9' in the carrier network 4 or the telecommunication network 8, respectively.

In FIG. 3, steps S15 to S30 illustrate a sequence of steps for synchronizing the forwarding-profile information in the central unit 2 and the network servers 41 and 51. For example, after the forwarding-profile information is received from the callee, in step S15, transmitted to the central unit 2, in step S16, and used to update the forwarding-profile information stored in the data store 25, in step S17, the profile management module 24 initiates (in pull mode) synchronization of the received forwarding-profile information with the forwarding-profile information stored in the data stores 413, 513 of the network servers 41 and 51.

Accordingly, in steps S18 and S21, in addition to the forwarding-profile information, the central unit 2 transfers a request to receive updates of local changes of forwarding-profile information from the network servers 41 and 51, respectively. Updates of the forwarding-profile information include local changes of the caller addresses in the caller groups or the destination addresses in the forwarding-profiles, e.g. changed telephone numbers of subscribers or new subscribers of the respective network.

In steps S19 and S22, the network servers 41 and 51 identify updates of local changes to the forwarding-profile information, i.e. changes that occurred locally in the network servers 41 and 51 since the time of the last synchronization request, and synchronize the forwarding-profile information received from the central unit 2 with the local changes, before updating the forwarding-profile information stored in the local data store 413 and 513, respectively, with the forwarding-profile information received from the central unit 2.

In steps S20 and S23, the requested updates with local changes of the forwarding-profile information are transmitted from the network servers 41 and 51 back to the central unit 2.

In step S24, the receiving module 22 of the central unit 2 receives the updates of forward-profile information from network servers 41 and 51 and the profile management module 24 synchronizes the forwarding-profile information stored in data store 25 with the local changes of the forwarding-profile information in the network servers 41 and 51.

Subsequently, in steps S25 and S27, the transferring module 23 of the central unit 2 transfers the synchronized forwarding-profile information to the network server 41 in the carrier network 4 and to the network server 51 in the enterprise network 5, where it is received by the communication interface 412 and the communication interface 512, respectively.

In steps S26 and S28, the forwarding-profile information is received and stored in the data stores 413 and 513 of the respective network servers 41, 51.

In step S29, the synchronized forwarding-profile information is transmitted to the user interface 100 and displayed in step S30 by the user interface 100.

In alternative embodiments, the synchronization of forwarding-profile information described in steps S15 to S30 is performed in a different order. Specifically, in a preferred embodiment, the updates of the forwarding-profile information are initiated by the network servers 41 and 51, i.e. the central unit 2 is not required to send a request to receive updates of forwarding-profile information from to the network servers 41 and 51, but the network servers 41 and 51 report proactively, i.e. in push mode, any local changes of the forwarding-profile information to the central unit 2.

In a further embodiment, the synchronization of forwarding-profile information is exclusively performed at the central unit 2, i.e. the network servers 41 and 51 are just receiving and transmitting forwarding-profile information and do not perform synchronization tasks.

In yet another preferred embodiment, which is illustrated in FIG. 4, the forwarding decisions are completely performed by the central unit 2. In step S31, a communication request arrives at network server 41. Next, the communication request or data associated with the communication request is forwarded to the central unit 2 in step S31. In step 533, the communication request is evaluated in the central unit 2 using the stored forwarding-profile information of the active forwarding-profile assigned to the callee. In other words, the central unit 2 determines the caller group and incoming communication technology associated with the respective communication request, and determines one or more destination addresses and outgoing communication technologies according to the currently active forwarding-profile. In step S34, forwarding information including one or more destination addresses and outgoing communication technologies is transferred from the central unit 2 to the communication interface 412 of the network server 41. In step S35, the actual forwarding of the communication request is performed by the forwarding module 411 of network server 41 according to the received forwarding information.

In a similar way, a communication request arriving at network server 51 in the enterprise network 5 is handled in steps S36 to S40. Again, the routing intelligence completely resides in the central unit 2 and the network server 51 just carries out the instructions received by the central unit 2.

Note that the specification of forwarding-profile information via the user interface 100 and the synchronization of forwarding-profile information are not depicted in FIG. 4. As described above, the synchronization of forwarding-profile information may be achieved in pull mode (as described with reference to steps S15 to S30 in FIG. 3) or in push mode.

It should be mentioned that in an alternative embodiment of the present invention, it is sufficient to transfer forwarding information to either the network server 41 or the network server 51. The forwarding information is then synchronized directly between the network servers 41 and 51, or, alternatively, the forwarding information is embedded in the forwarded communication, e.g., for the case of packetized networks.

Figure 5:
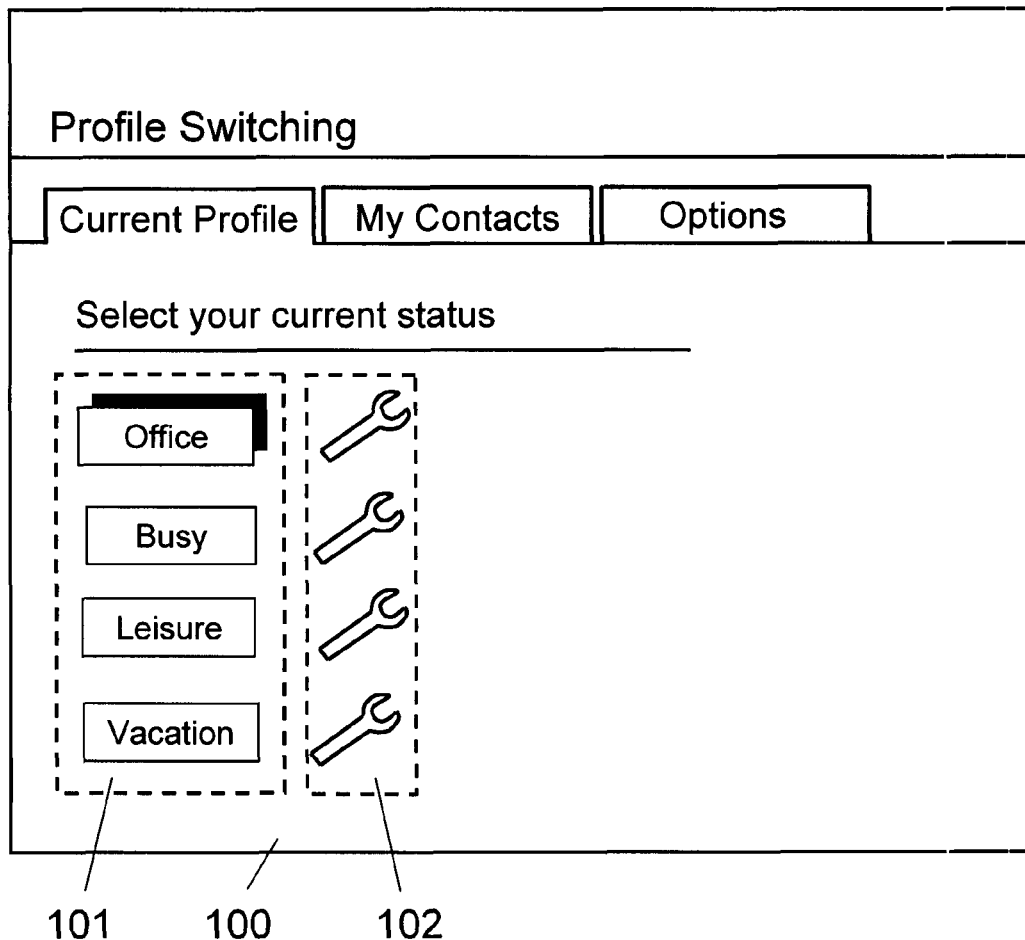
FIGS. 5, 6 and 7 show different aspects of an exemplary embodiment of a user interface provided by the central unit to callees for setting up and managing the forwarding-profile information.

FIG. 5 illustrates an exemplary implementation of the user interface 100. In the illustrated example, the forwarding-profile information is tailored to the needs of a callee which is an employee of a company. In this example, it is assumed that said company is operating the enterprise network 5. FIG. 5 displays a list of stored forwarding-profiles, named "Office", "Busy", "Leisure" and "Vacation". An active forwarding-profile is selectable using the radio buttons 101. In the example of FIG. 5, the forwarding-profile "Office" is the active forwarding-profile. Using buttons 102, the callee can modify or configure existing forwarding-profiles as well as create and name new forwarding-profiles.

Figure 6:
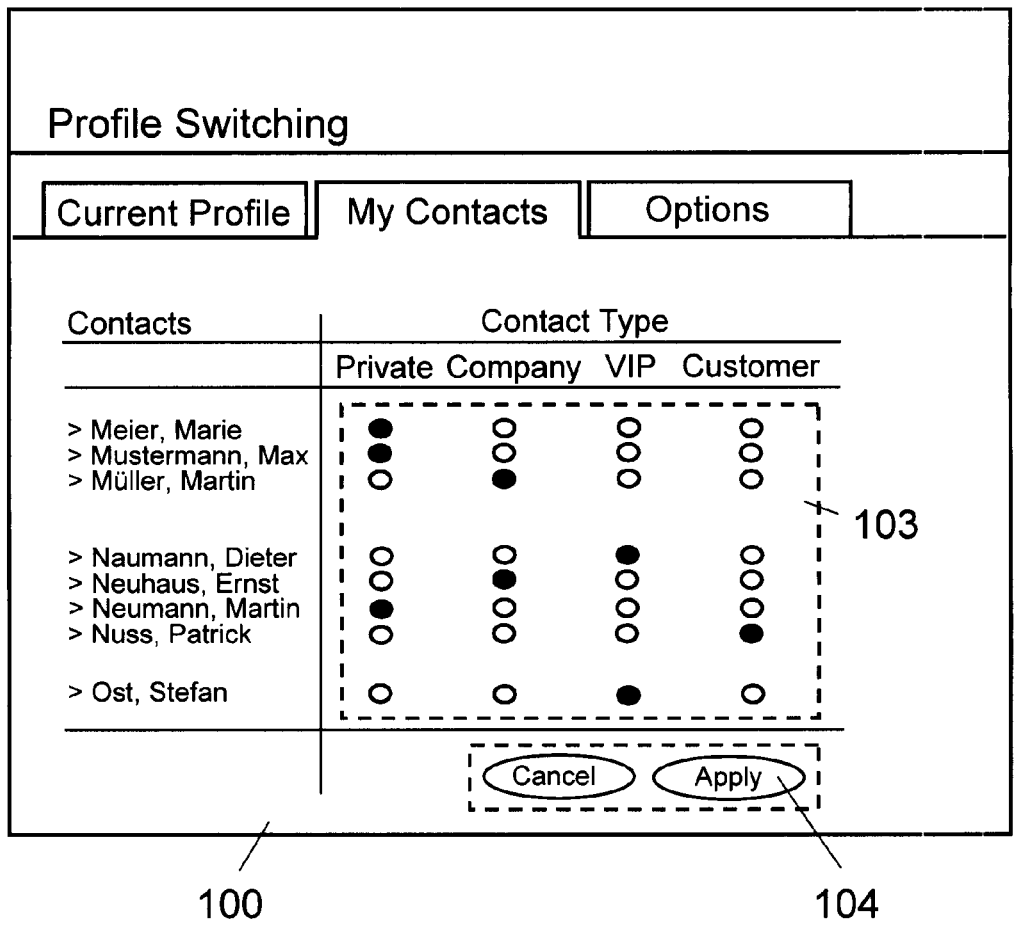

FIG. 6 illustrates an exemplary view of the user interface 100 where the callee has to categorize his contacts, i.e. possible callers, into caller groups. The example comprises four caller groups named "Private", "Company", "VIP" and "Customer". It is assumed that the callee can create and name new caller groups, and insert new callers in the list of callers, both manually and by importing user information from the network servers 41 and 51. With the help of the checkboxes 103, callers can be assigned to caller groups. By pressing the apply-button 104, the caller groups are activated and used to forward communication requests.

In a further embodiment of the present invention, callers which are not explicitly associated with one of the specified caller groups are associated by default with a group called "Unknown". In yet another embodiment of the present invention, callers which are not explicitly associated with one of the specified caller groups are associated with one of the specified caller groups, e.g. "Customer" in the above mentioned example.

Figure 7:
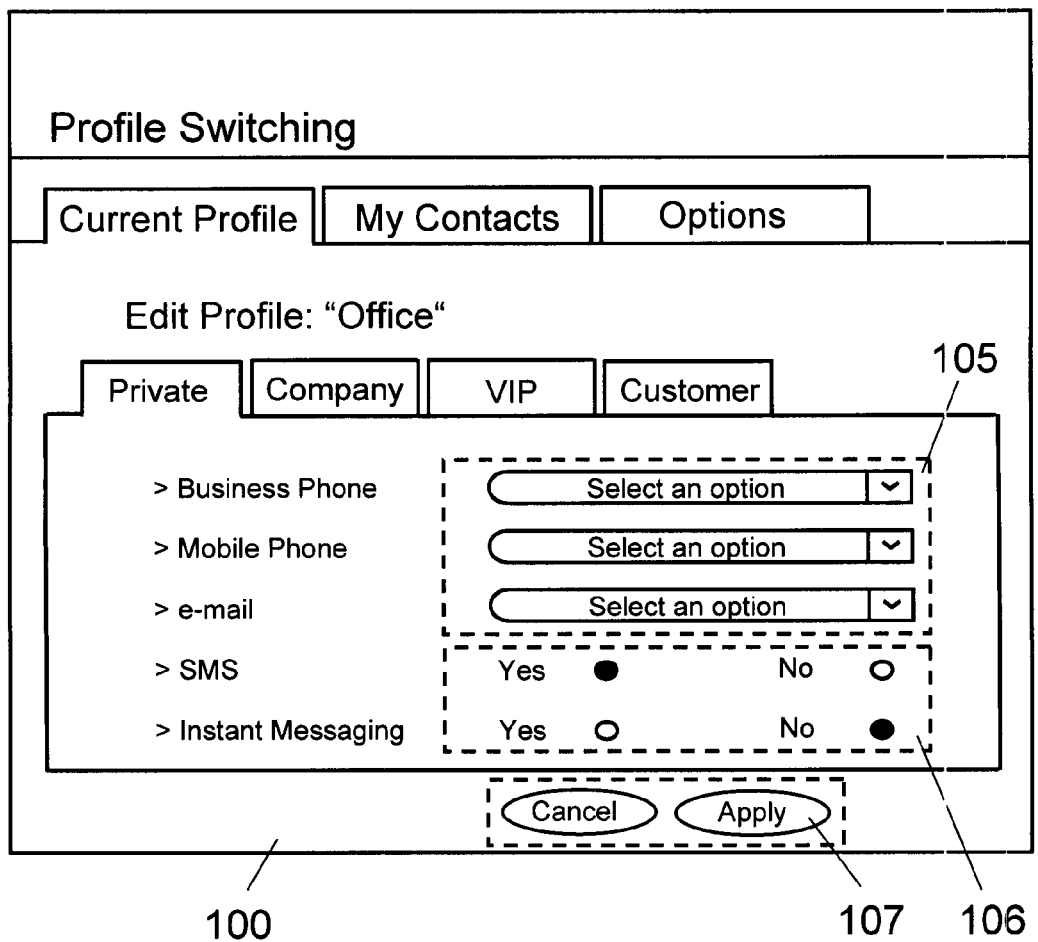

FIG. 7 illustrates an example of specifying forwarding-schemes via the user interface 100. For each forwarding-profile and each caller group and each incoming communication technology, a destination address with associated outgoing communication technology can be specified. In this example, the forwarding-schemes for the business phone, the mobile phone and the callee's e-mail can be selected using the drop-down list 105.

For the business phone of the callee, the forwarding-scheme can be set to e.g. forwarding a telephone call to an answering machine, forwarding a telephone call to a certain destination address (i.e. one or more telephone numbers), send an SMS notification to a certain destination address, or directly forward the telephone call to the business phone of the callee. If in a forwarding-scheme no destination address is specified by the callee, communication requests, e.g. from a certain caller group, are blocked and not forwarded. In this example, the forwarding of SMS and Instant Messaging is enabled/disabled using the buttons 106. By pressing the apply-button 107, the forwarding-schemes are activated and used to forward communication requests.

It should be noted that, in the description, the computer program code has been associated with specific function modules and the sequence of the steps has been presented in a specific order, one skilled in the art will understand, however, that the computer program code may be structured differently and that the order of at least some of the steps could be altered, without deviating from the scope of the invention.

What is claimed is:

1. A method of enabling forwarding of communication requests directed by callers to a callee, who is a subscriber of a carrier network and a user of an enterprise network, the method comprising:

receiving in a central unit forwarding-profile information which defines the forwarding of communication requests directed to the callee by the callers, wherein receiving the forwarding-profile information in the central unit comprises receiving forwarding-schemes which specify for different communication technologies, including at least one of: voice phone call, video phone call, SMS, e-mail, Social Networks and instant messaging, whether a communication request received through one of these technologies is forwarded to one or more destination addresses using a communication technology specified by the forwarding-scheme;

storing in the central unit forwarding-profiles defined by the forwarding-profile information and assigned to the callee; and transferring, by the central unit, forwarding information to at least one of a network server in the carrier network and a network server in the enterprise network, for enabling the network server in the carrier network and the network server in the enterprise network to forward the communication requests based on forwarding-profiles assigned to the callee.

2. The method of claim 1, further comprising the central unit providing user interface; receiving through a telecommunication network the forwarding-profile information entered by the callee via the user interface; storing the forwarding-profile information at the central unit; and displaying via the user interface the forwarding-profile information stored at the central unit.

3. The method of claim 2, further comprising receiving by the central unit via the user interface a selection by the callee of an active forwarding-profile from a plurality of forwarding-profiles associated with the callee; transferring by the central unit the callee's selection of the active forwarding-profile to at least one network server in the carrier network and at least one network server in the enterprise network for enabling the network server in the carrier network and the network server in the enterprise network to forward the communication requests based on the active forwarding-profile of the callee.

4. The method of one of claims 1 to 3, further comprising synchronizing forwarding-profiles of the callee in the carrier network and in the enterprise network by receiving in the central unit altered forwarding-profile information from the network server in the carrier network and from the network server in the enterprise network, and by transferring the altered forwarding-profile information from the central unit to the network server in the carrier network or the network server in the enterprise network, respectively.

5. The method of claim 1, wherein receiving the forwarding-profile information comprises receiving categorizations of callers into caller groups; receiving destination addresses for forwarding communication requests to the callee; and receiving forwarding-schemes which specify for the caller groups whether a communication request is forwarded to one or more of the destination addresses.

6. The method of claim 1, further comprising the forwarding information enabling at least one network server in the carrier network and at least one network server in the enterprise network to determine for the communication requests in each case a caller group and communication technology associated with the respective communication request; to determine a forwarding-scheme defined by an active forwarding-profile selected by the callee; and to forward the communication request from the caller according to the forwarding-scheme defined by the active forwarding-profile to one or more destination addresses using the communication technology specified by the forwarding-scheme.

7. A computer system for enabling forwarding of communication requests directed by callers to a callee, who is a subscriber of a carrier network and a user of an enterprise network, the computer system comprising:
a receiving module configured to receive in a central unit forwarding-profile information which defines the forwarding of communication requests directed to the callee by the callers, wherein the receiving module is configured to receive forwarding-schemes which specify for different communication technologies, including at least one of: voice phone call, video phone call, SMS, e-mail, Social Networks and instant messaging, whether a communication request received through one of these technologies is forwarded to one or more destination addresses using a communication technology specified by the forwarding-scheme;
a profile management module configured to store in the central unit forwarding-profiles defined by the forwarding-profile information and assigned to the callee; and
a transferring module configured to transfer from the central unit forwarding-information to at least one of: a network server in the carrier network and a network server in the enterprise network, for enabling the network server in the carrier network and the network server in the enterprise network to forward the communication requests based on forwarding-profiles assigned to the callee.

8. The computer system of claim 7, wherein the computer system further comprises a user interface; the receiving module is configured to receive through a telecommunication network the forwarding-profile information entered by the callee via the user interface, and to store the forwarding-profile information at the central unit; and the user interface is configured to display the forwarding-profile information stored at the central unit.

9. The computer system of claim 8, wherein the receiving module is configured to receive, via the user interface, a selection by the callee of an active forwarding-profile from a plurality of forwarding-profiles associated with the callee; and the transferring module is configured to transfer the callee's selection of the active forwarding-profile to at least one network server in the carrier network and at least one network server in the enterprise network for enabling the network server in the carrier network and the network server in the enterprise network to forward the communication requests based on the active forwarding-profile.

10. The computer system of one of claims 7 to 9, further comprising a profile management module configured to synchronize the forwarding-profiles of the callee in the carrier network and in the enterprise network by receiving altered forwarding-profile information from the network server in the carrier network and from the network server in the enterprise network, and by transferring the altered forwarding-profile information to the network server in the carrier network or the network server in the enterprise network, respectively.

11. The computer system of claim 7, wherein the receiving module is configured to receive in the forwarding-profile information categorizations of callers into caller groups, destination addresses for forwarding communication requests to the callee, and forwarding-schemes which specify for the caller groups whether a communication request is forwarded to one or more of the destination addresses.

12. The computer system of claim 7, wherein the network server in the carrier network and the network server in the enterprise network comprise communication interfaces configured to receive forwarding-profile information from the central unit; and forwarding modules configured to determine for the communication requests in each case a caller group and communication technology associated with the respective communication request, to determine a forwarding-scheme defined by an active forwarding-profile selected by the callee; and to forward the communication request from the caller according to the forwarding-scheme defined by the active forwarding-profile to one or more destination addresses using the communication technology specified by the forwarding-scheme.

13. A method of enabling forwarding of communication requests directed by callers to a callee, who is a subscriber of a carrier network and a user of an enterprise network, the method comprising:
receiving in a central unit forwarding-profile information which defines the forwarding of communication requests directed to the callee by the callers;
storing in the central unit forwarding-profiles defined by the forwarding-profile information and assigned to the callee; and transferring, by the central unit, forwarding information to at least one of a network server in the carrier network and a network server in the enterprise network, for enabling the network server in the carrier network and the network server in the enterprise network to forward the communication requests based on forwarding-profiles assigned to the callee;

wherein the forwarding information enable at least one network server in the carrier network and at least one network server in the enterprise network:

to determine for the communication requests in each case a caller group and communication technology associated with the respective communication request;

to determine a forwarding-scheme defined by an active forwarding-profile selected by the callee; and to forward the communication request from the caller according to the forwarding-scheme defined by the active forwarding-profile to one or more destination addresses using the communication technology specified by the forwarding-scheme.

14. The method of claim 13, further comprising the central unit providing user interface; receiving through a telecommunication network the forwarding-profile information entered by the callee via the user interface; storing the forwarding-profile information at the central unit; and displaying via the user interface the forwarding-profile information stored at the central unit.

15. The method of claim 14, further comprising receiving by the central unit via the user interface a selection by the callee of an active forwarding-profile from a plurality of forwarding-profiles associated with the callee; transferring by the central unit the callee's selection of the active forwarding-profile to at least one network server in the carrier network and at least one network server in the enterprise network for enabling the network server in the carrier network and the network server in the enterprise network to forward the communication requests based on the active forwarding-profile of the callee.

16. The method of one of claims 13 to 15, further comprising synchronizing forwarding-profiles of the callee in the carrier network and in the enterprise network by receiving in the central unit altered forwarding-profile information from the network server in the carrier network and from the network server in the enterprise network, and by transferring the altered forwarding-profile information from the central unit to the network server in the carrier network or the network server in the enterprise network, respectively.

17. The method of claim 13, wherein receiving the forwarding-profile information comprises receiving categorizations of callers into caller groups; receiving destination addresses for forwarding communication requests to the callee; and receiving forwarding-schemes which specify for the caller groups whether a communication request is forwarded to one or more of the destination addresses.

18. A computer system for enabling forwarding of communication requests directed by callers to a callee, who is a subscriber of a carrier network and a user of an enterprise network, the computer system comprising:

a receiving module configured to receive in a central unit forwarding-profile information which defines the forwarding of communication requests directed to the callee by the callers;

a profile management module configured to store in the central unit forwarding-profiles defined by the forwarding-profile information and assigned to the callee; and a transferring module configured to transfer from the central unit forwarding-information to at least one of: a network server in the carrier network and a network server in the enterprise network, for enabling the network server in the carrier network and the network server in the enterprise network to forward the communication requests based on forwarding-profiles assigned to the callee;

wherein the network server in the carrier network and the network server in the enterprise network comprise communication interfaces configured to receive forwarding-profile information from the central unit; and forwarding modules configured to determine for the communication requests in each case a caller group and communication technology associated with the respective communication request, to determine a forwarding-scheme defined by an active forwarding-profile selected by the callee; and to forward the communication request from the caller according to the forwarding-scheme defined by the active forwarding-profile to one or more destination addresses using the communication technology specified by the forwarding-scheme.

19. The computer system of claim 18, wherein the computer system further comprises a user interface; the receiving module is configured to receive through a telecommunication network the forwarding-profile information entered by the callee via the user interface, and to store the forwarding-profile information at the central unit; and the user interface is configured to display the forwarding-profile information stored at the central unit.

20. The computer system of claim 19, wherein the receiving module is configured to receive, via the user interface, a selection by the callee of an active forwarding-profile from a plurality of forwarding-profiles associated with the callee; and the transferring module is configured to transfer the callee's selection of the active forwarding-profile to at least one network server in the carrier network and at least one network server in the enterprise network for enabling the network server in the carrier network and the network server in the enterprise network to forward the communication requests based on the active forwarding-profile.

21. The computer system of one of claims 18 to 20, further comprising a profile management module configured to synchronize the forwarding-profiles of the callee in the carrier network and in the enterprise network by receiving altered forwarding-profile information from the network server in the carrier network and from the network server in the enterprise network, and by transferring the altered forwarding-profile information to the network server in the carrier network or the network server in the enterprise network, respectively.

22. The computer system of claim 18, wherein the receiving module is configured to receive in the forwarding-profile information categorizations of callers into caller groups, destination addresses for forwarding communication requests to the callee, and forwarding-schemes which specify for the caller groups whether a communication request is forwarded to one or more of the destination addresses.

* * * * *